United States Patent
Perng et al.

(10) Patent No.: US 11,816,246 B2
(45) Date of Patent: Nov. 14, 2023

(54) MODELING TECHNIQUES TO CLASSIFY DATA SETS CONTAINING PERSONAL IDENTIFIABLE INFORMATION COMPRISING NUMERICAL IDENTIFIERS

(71) Applicant: Microsoft Technology Licensing, LLC, Redmond, WA (US)

(72) Inventors: Chang-Shing Perng, Cupertino, CA (US); Vishal Khushal Gosar, Los Angeles, CA (US); Harish Ankam, Milpitas, CA (US); Haoji Liu, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 359 days.

(21) Appl. No.: 17/385,647

(22) Filed: Jul. 26, 2021

(65) Prior Publication Data

US 2023/0027615 A1    Jan. 26, 2023

(51) Int. Cl.
*H04L 9/40* (2022.01)
*H04L 9/06* (2006.01)
*G06F 21/62* (2013.01)
*G06F 16/28* (2019.01)
*G06F 16/22* (2019.01)
*G06F 21/60* (2013.01)

(52) U.S. Cl.
CPC ...... *G06F 21/6254* (2013.01); *G06F 16/2237* (2019.01); *G06F 16/285* (2019.01); *G06F 21/602* (2013.01)

(58) Field of Classification Search
CPC ............. G06F 21/6254; G06F 16/2237; G06F 16/285; G06F 21/602
USPC .......................................................... 726/26
See application file for complete search history.

(56) References Cited

U.S. PATENT DOCUMENTS 11,558,414 B1 *   1/2023   Nguyen .............. H04L 63/1433
11,756,544 B2 *   9/2023   Sharifi .................... G06F 3/165
                                                        704/257

(Continued)

OTHER PUBLICATIONS

"California Consumer Privacy Act (CCPA)", Retrieved From: https://oag.ca.gov/privacy/ccpa, Retrieved on: Jun. 9, 2021, 7 Pages.

(Continued)

*Primary Examiner* — Haresh N Patel
(74) *Attorney, Agent, or Firm* — NICHOLSON DE VOS WEBSTER & ELLIOTT LLP (57) ABSTRACT

Modeling techniques to classify data sets containing personal identifiable information (PII) comprising identifiers are provided. In one technique, multiple data sets are identified, each data set containing identifiers that were generated by a computer system and that qualify as PII of a known identifier (ID) type. For each of the multiple data sets, a model is generated based on that data set and added to a set of models. A target data set that contains identifiers that were generated by the computer system and that qualify as PII of an unknown ID type is identified. A target model is generated based on the target data set. For at least one model in the set of models, a similarity operation of that model and the target model is performed. Based on the similarity operation, it is determined whether to associate the ID type of that model with the target data set.

20 Claims, 6 Drawing Sheets

(56) References Cited

U.S. PATENT DOCUMENTS

| | | | | |
|---|---|---|---|---|
| 2013/0117232 | A1* | 5/2013 | Lee | G06F 16/214 |
| | | | | 707/E17.127 |
| 2018/0189628 | A1* | 7/2018 | Kaufmann | G06N 3/006 |
| 2019/0325864 | A1* | 10/2019 | Anders | G06F 40/56 |
| 2021/0173854 | A1* | 6/2021 | Wilshinsky | G06F 16/287 |
| 2022/0101161 | A1* | 3/2022 | Goel | G06N 20/00 |
| 2022/0237565 | A1* | 7/2022 | Dzierzanowski | G06Q 10/103 |
| 2022/0309389 | A1* | 9/2022 | Zivkovic | G10L 15/01 |
| 2022/0335256 | A1* | 10/2022 | Saraee | G06V 10/82 |
| 2022/0335614 | A1* | 10/2022 | Punyani | G06N 20/00 |
| 2022/0351720 | A1* | 11/2022 | Alon | G10L 15/083 |
| 2022/0366903 | A1* | 11/2022 | Carbune | G10L 15/22 |
| 2022/0415319 | A1* | 12/2022 | Nainaparampil | G06F 40/30 |
| 2023/0007023 | A1* | 1/2023 | Andrabi | H04L 63/1425 |
| 2023/0021849 | A1* | 1/2023 | Olenoski | G06N 20/00 |

OTHER PUBLICATIONS

"General Data Protection Regulation", Retrieved From: https://en.wikipedia.org/wiki/General_Data_Protection_Regulation, May 29, 2021, 26 Pages.

"Homogeneity (statistics)", Retrieved From: https://en.wikipedia.org/wiki/Homogeneity_(statistics), Jan. 6, 2021, 3 Pages.

"What is Considered Personal Data Under the EU GDPR?", Retrieved From: https://gdpr.eu/eu-gdpr-personal-data/, Retrieved On: Jun. 9, 2021, 5 Pages.

* cited by examiner

MODELING TECHNIQUES TO CLASSIFY DATA SETS CONTAINING PERSONAL IDENTIFIABLE INFORMATION COMPRISING NUMERICAL IDENTIFIERS

TECHNICAL FIELD

The present disclosure generally relates to obfuscating personal identifiable information (PII) and, more specifically, to modeling techniques to automatically classify data sets containing PII.

BACKGROUND

An essential component of Compliance and Privacy laws and regulations (for example, GDPR and CCPA) is the mandate for any company that collects customer information to protect personally identifiable information (PII) with strict rules around how the data is used, stored, secured, encrypted, transmitted, and accessed. Therefore, it is imperative to identify all PII in collected data.

PII can be categorized into two types: identifier (ID) types and non-ID types. PII of non-ID types is data that is directly collected from customers, such as names, email addresses, phone numbers, postal addresses, date of birth. PII of ID types is data that is generated by software to represent certain entities. Examples of ID types include a user ID, a content provider ID, a message ID, a post ID, and a content ID.

Regarding ID types, many data values of ID types are numerical values and lack any hint of the nature of the ID type, which makes it difficult to detect to which ID type the data values belong. Consequently, it is easy for such data values to be mistaken as belonging to incorrect ID type. For example, a column in a table containing numeric values, such as "5234567", could be of any of the five ID types mentioned above.

Knowing the correct ID type is critical for proper obfuscation. For example, a large enterprise stores information in thousands of different tables that are created, managed, and/or accessed by many different engineering or data scientist teams. Data values of one ID type may exist in many different tables. One reason to obfuscate data values of one ID type in the same manner is to allow for some data values to be analyzed together. For example, two tables with the same ID-type column will not be joinable on that column if the respective ID type columns are not obfuscated with the same hash key or the same encryption key. Thus, identifying ID type PII is critical for obfuscation and data analysis.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically classifying each of one or more data sets, containing PII that comprises numerical identifiers, as belonging to a known ID type are provided. Values in a data set may be automatically qualified as PII if the values are of a certain data type, such as numeric identifiers. Alternatively, values in a data set may be manually qualified as PII. In order to properly classify a data set containing PII as containing a particular ID type (from among multiple candidate ID types), a statistical model is automatically generated for known ID types and used to predict whether a given set of data values belongs to a known ID type. For example, for each data set of a known ID type, a statistical model is generated based on a histogram of values in the data set. The same type of statistical model is generated for each data set of an unknown ID type. A similarity comparison is performed between each "unknown" data set and each "known" data set. For each unknown data set, the known data set with the highest score (or lowest score, depending on the similarity operation) relative to that unknown data set is selected as a candidate known data set. The ID type of the candidate known data set may be associated with that unknown data set and may be presented to a user for confirmation.

Embodiments improve computer-related technology that increases data security and the utility of obfuscated data, while reducing errors in labeling data sets. In enterprises that store thousands or tens of thousands of data sets with unknown ID types, manually tagging such data sets not only requires a significant amount of time and knowledge of the data sets, but manually tagging leads to mis-tagging of data sets, which makes those data sets virtually useless for data analysis operations. As an example, in one enterprise, the mis-tagging rate was measured to be over 25%. The automatic tagging embodiments described herein can reduce the mis-tagging rate substantially without requiring significant computer resources and, in some embodiments, remove user involvement in tagging altogether.

System Overview

Figure 1:
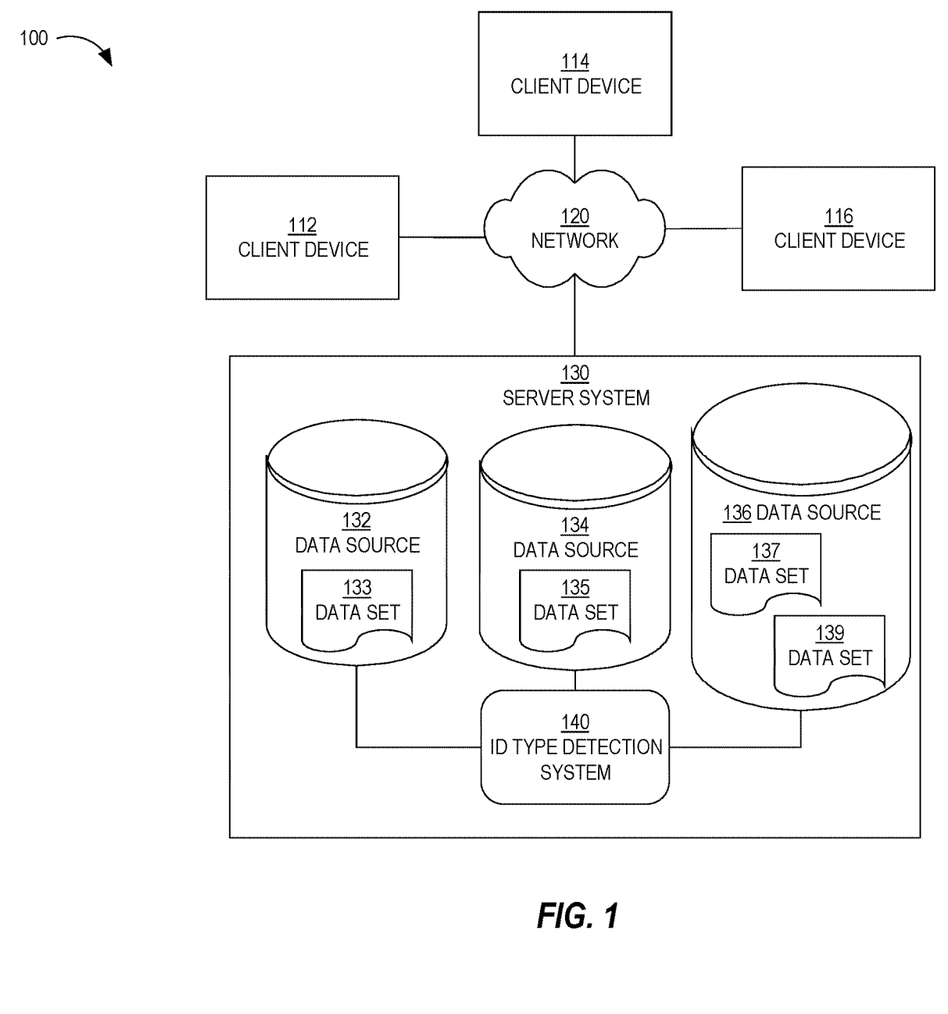
FIG. 1 is a block diagram that depicts an example system that stores data sets containing PII of varying ID types, in an embodiment.

FIG. 1 is a block diagram that depicts an example system 100 that stores data sets containing PII of varying ID types, in an embodiment. System 100 includes client devices 112-116, a network 120, and a server system 130. Although only three client devices are depicted, many client devices may be communicatively coupled to server system 130 through network 120 and/or other networks (not depicted). Server system 130 comprises one or more computing elements that perform the operations described herein as being performed by server system 130.

Network 120 is a computer network, examples of which include a local area network (LAN), a wide area network (WAN), and the Internet.

Examples of client devices 112-116 include a desktop computer, a laptop computer, a tablet computer, a wearable device, a video game console, and a smartphone.

A client device may receive content from server system 130 in response to transmitting a content request over network 120 to server system 130. Examples of a content request include a search request and a page request. A search request includes one or more query terms that are entered through the client device, such as through a physical keyboard of the client device or a graphical keyboard that is presented on a touchscreen display of the client device. A page request includes a uniform resource locator (URL) of a resource (e.g., web page) that server system 130 hosts.

A client application executing on the client device transmits the content request to server system 130. Examples of such a client application include (1) a web application that executes within a web browser that executes on the client device and (2) a native application that is installed on the client device and is configured to communicate with server system 130.

A client device may receive content from server system 130 not in response to a content request from the client device. For example, server system 130 identifies content that server system 130 determines is relevant to a user of the client device and sends, to the client device or to an account of the user, a notification of the content in the form of an instant message, a text message, an email message, a push notification, or an in-app notification. Later, the user, operating the client device or another device, views the notification and determines whether to select any links to content found in the notification, the links referencing content hosted by server system 130 and/or another computer system.

Server system 130 comprises an ID type detection system 140 and data sources 132-136, each containing one or more data sets. For example, data source 132 contains data set 133, data source 134 contains data set 135, and data source 136 contains data sets 137 and 139. Examples of data sources include databases and file systems. Data sources 132-136 may be non-volatile data sources. An original source of data in data sources 132-136 may include data from client devices 112-116. Examples of such data are user profile data (e.g., job title, job function, industry, skills, names of current and past employers, names of academic institutions attended, and country, state, and city of residence) of multiple (e.g., millions of) users and organization profile data (e.g., organization name, products/services designed or manufactured, industry, mailing address, phone number, number of members/employees, current job openings) of multiple organizations.

Also, data generated based on data requests from (and responses to) data requests may be stored in one or more of data sources 132-136. Examples of such data include IDs of page requests, queries submitted, IDs of messages sent to other users, IDs of messages received from other users, IDs of posts drafted and uploaded, IDs of posts interacted with (e.g., liked, shared, commented), IDs of content items (e.g., advertisements) interacted with, and IDs of other users interacted with.

ID type detection system 140 uses the ID types of data sets whose ID types are known to server system 130 in order to detect the ID type(s) of data sets whose ID types are not known to server system 130. For example, if data set 133 has an ID type that is known to server system 130 and data set 137 has an ID type that is unknown to server system 130, then ID type detection system 140 may leverage data set 133 (and, optionally, other data sets whose ID types are known to server system 130) in order to detect the ID type of data set 137.

Data Set

A data set is a set of multiple entity identifiers that corresponds to a single ID type, such as a member ID, a group ID, a content item ID, a message ID, a post ID, a skill ID, or a company ID. Examples of a data set include a column of a table (comprising rows), a field of a relation (comprising records), and an attribute of an object. There may be tens or hundreds of ID types, each corresponding to PII and, therefore, requiring data obfuscation, such as encryption or hashing. Thus, one data set may correspond to a first ID type (e.g., member ID) and another data set may correspond to a second ID type (e.g., message ID). Some data sets may be part of the same database object (e.g., table) or file system file. In some implementations, server system 130 comprises hundreds, thousands, or hundreds of thousands of data sets.

The values in a data set associated with an ID type are bounded by a range for a given time. For example, one way for assigning a member ID to members of an online service (such as an online networking service) is to sequentially assign an integer as the member ID according to the order that members create their respective accounts. A similar implementation may apply to other ID types.

A data set may include multiple instances of the same value. For example, a table of electronic messages includes at least three columns or data sets: one for user/member ID of the sender, one for user ID of the receiver, and one for message ID of the message. If a sender composed and caused four electronic messages to be transmitted to one or more other users, then the sender column (or data set) will include at least four instances of the sender's user ID. Similarly, if a receiver's messaging account received eight electronic messages, then the receiver column (or data set) will include at least eight instances of the receiver's user ID.

Different engineering teams are typically responsible for creating or maintaining different data sets. For example, one engineering team creates a first table with one data set and another engineering team creates a second table with another data set. Each engineering team may be responsible for "tagging" each data set with the appropriate ID type. "Tagging" a data set with an ID type involves selecting ID type identification data (that identifies a particular ID type) to store in association with the data set. The ID type of a data set may be stored in metadata of the data set or in metadata of a higher-level data set that comprises the data set, such as metadata of a table that comprises a column.

If an engineering team member tags a data set with the incorrect ID type, then that column might be rendered unusable in data analysis with other data sets of the same ID type. For example, joining two data sets that are tagged with the same ID type even though they correspond to different ID types may result in no data value matches and will result in an incorrect understanding of the data sets.

Model Generation and Id Type Detection

In an embodiment, a model is generated for each of multiple data sets and models of two data sets are compared to determine whether the two data sets are of the same ID type. An insight into model generation and comparison is that if two data sets are of the same ID type, then the data sets should be similar along one or more dimensions or factors, such as the respective ranges of values in the data sets and the frequency of certain values in the data sets.

Figure 2:
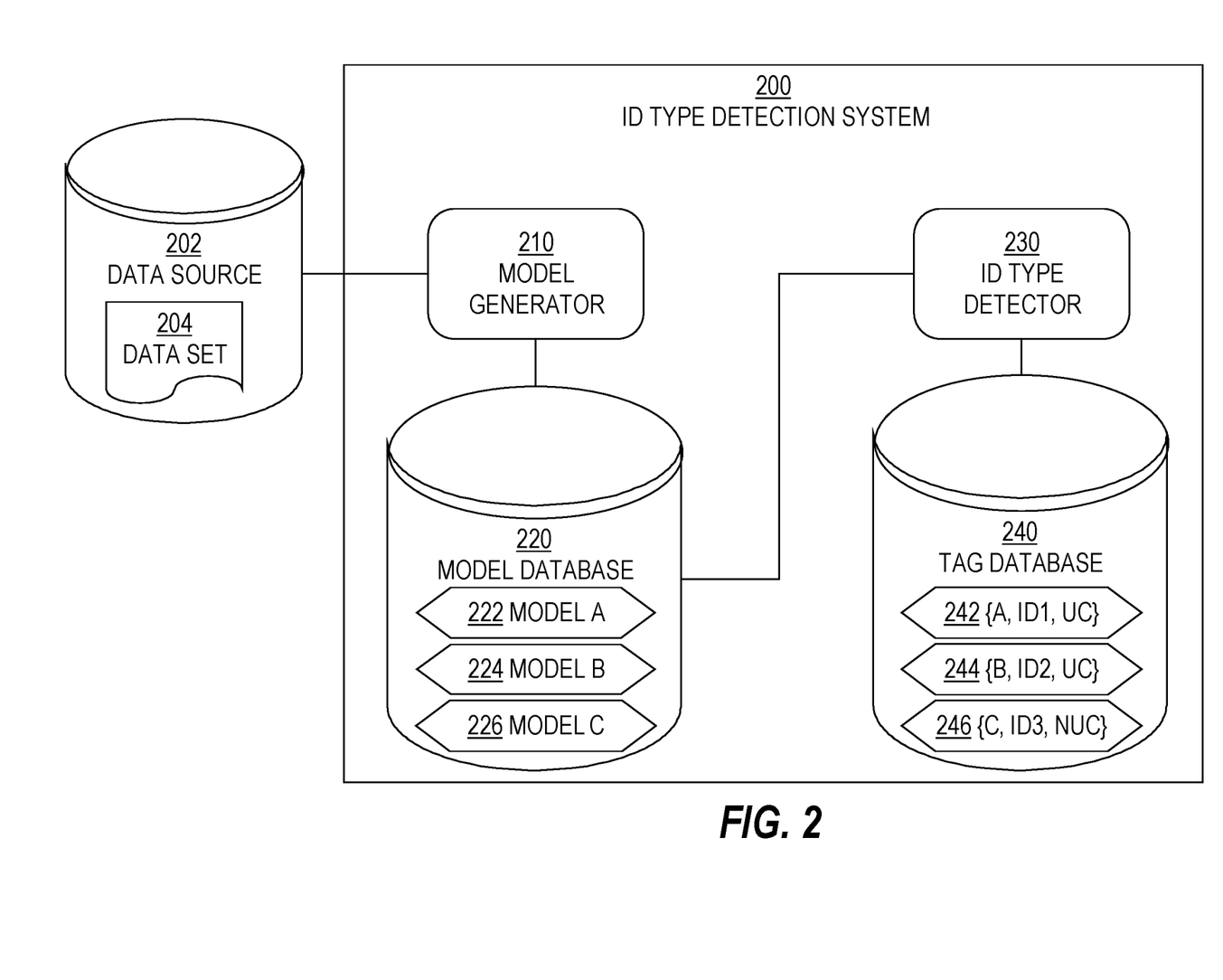
FIG. 2 is a block diagram that depicts an example model generation and ID type detection system, in an embodiment.

FIG. 2 is a block diagram that depicts an example ID type detection system 200, in an embodiment. ID type detection system 200 corresponds to ID type detection system 140 of FIG. 1. ID type detection system 200 includes a model generator 210, a model database 220 that stores models generated by model generator 210, and an ID type detector 230 that determines whether a data set with an unknown ID type (referred to as an "unknown data set") should be automatically tagged with a known ID type based on a comparison of a model of the data set with models of data sets of known ID types (referred to as "known data sets").

Thus, model generator 210 is communicatively coupled to a data source 202 that contains one or more data sets, such as data set 204. Data source 202 corresponds to one of data sources 132-136 and generates models (which is described in more detail herein) for known data sets (referred to herein as "known models") and models for unknown data sets (referred to herein as "unknown models"). A known data set is associated with ID type identification data, which may have been generated automatically or based on input from a user. If a data set is not associated with ID type identification data, then it can be presumed that the data set is of an unknown ID type.

Before generating models for unknown data sets, model generator 210 may generate models for known data sets. For example, model generator 210 scans metadata of data sets (e.g., stored in one of data sources 132-136) to determine which data sets are associated with ID type identification data. If a data set is associated with ID type identification data, then model generator 210 generates a model for the data set.

In an embodiment, model generator 210 maintains a list of data sets for which models have been generated. In this way, model generator 210 is not required to access data sources 132-136 or read ID type identification data that may be stored in many different locations. Each entry in the list may identify a data set, identify a storage location of the data set (e.g., a data source identifier and a name of a folder in which the data set is logically stored), identify an ID type of the data set, include a model that was generated for the data set, and/or include a date on which the model was generated.

The storage location of a known data set may be used to access the data set again and generate a new model for the data set. Regenerating a model for a data set may be prudent if the data set changes substantially over time. Changes to a data set may include insertions of data values to the data set, deletions of data values from the data set, and/or updates to data values in the data set. An "update" may be considered a deletion followed by an insertion.

In an embodiment, model generator 210 generates a model for each of multiple data sets even though the data sets are associated with the same known ID type. Having multiple models for the same ID type is useful when different data sets of the same ID type have different distributions of data because having these multiple models increases the chances of matching one of those models with a model of an unknown data set.

Model Generation

In an embodiment, a model for a data set comprises a normalized vector and, optionally, a data range. To compute a normalized vector for a data set, a frequency of each value in the data set is determined and squared. The resulting squared values are totaled or summed and a square root is computed from the sum. The range (R) of values in a data set (M) and the square root value may be denoted, respectively, as follows:

$$R=[lb, ub]$$

$$S_m = \text{Sqrt} < c(lb)^2 + c(lb+1)^2 + \ldots + c(ub)^2 >$$

where lb denotes the lower bound of the range, ub denotes the upper bound of the range, and the function c( ) denotes the number of times the value x is found in the data set M. The lower bound (or minimum value) of a data set may be determined by scanning the data set. The first value in the data set is temporarily set to the current minimum value and, for each subsequent value in the data set, that subsequent value is compared to the current minimum value. If the subsequent value is less than the current minimum value, then the current minimum value is updated to be the subsequent value. The process repeats for each subsequent value in the data set. The current minimum value after considering all the values in the data set becomes the lower bound. A similar process is used to determine the upper bound in the data set.

In order to determine c(x) for each value in a data set, a vector may be created where each value in the data set acts as an index into the vector. Thus, the size of each vector may be set to a size that is greater than the value in any data set. As an example, if it is known that values (e.g., identifiers) do not go higher than ten billion, then the size of each vector may be set to ten billion. In some instances, the value in many of the entries of the vector may be zero or NULL since values in a data set may start with a value much greater than 0, such as one million, or the range of the data set is relatively narrow. In order to generate such a vector for a data set, the data set may be scanned one value (or identifier) at a time. For each value, the value is used to lookup an entry in the vector and increment the current value in the entry by 1. After a lookup, in the embodiment where the current value of an entry is NULL, the current value of that entry is set to 1.

In an embodiment, a data set is sampled such that only a strict subset (e.g., 10%) of the values in the data set is considered when generating a model of the data set. For uniformity among the models, a sampling policy may be to sample no more than N values from each data set. Sampling is useful when the size of the data set is relatively large in number, such as over a million values. In this embodiment, the range of a data set M may be defined as follows:

$$[\min(M)*(1-f), \max(M)*(1+f)]$$

where f is a factor between 0 and 1. The more data that is sampled, the smaller the f may be, since there is more confidence of the range.

Once a square root value ($S_m$) is computed for a data set M, a normalized vector ($C_m$) is computed where each value in data set M is divided by $S_m$. Such a computation may be denoted as follows:

$$C_m = <c(lb)/S_m, c(lb+1)/S_m, \ldots, c(ub)/S_m>$$

where $C_m$ is a normalized vector of length 1 and c(x) denotes the number of times the value x is found in the data set M. Thus, the normalized vector may be generated from another vector from which c(x) was determined.

The resulting model of data set M may be represented as ($R_m$, $C_m$), where $R_m$ is the range of values within data set M and $C_m$ is a normalized vector of data set M.

The resulting model is stored in model database 220. In the depicted example, model database 220 includes a model A 222 for a data set A (not depicted), a model B 224 for a data set B (not depicted), and a model C 226 for a data set C (not depicted). For example, models A 222 and B 224 may be known models, where model A 222 includes a range of data set A and a normalized vector generated based on data set A according to the technique described above and model B 224 includes a range of data set B and a normalized vector generated based on data set B according to the technique described above. However, data set C may be unknown, meaning model C 226 is an unknown model.

Because different data sets have different ranges, the size of a vector of one model may be different from the sizes of vectors of other models. In an embodiment, to ensure that the normalized vectors of all models are the same size (which makes some similarity operations easier to perform), the size of each normalized vector is pre-defined. The size may be pre-defined by an administrator of server system 130 or someone who has knowledge about the ranges of values of various data sets. For example, if it is known that identifiers increment for each new type of entity of the corresponding ID type and the current maximum identifier in all data sets is 8489608499, then the size may be set to be 10 times that value, knowing that it will take a significant amount of time for a new identifier of that type to be equivalent to that size.

Model generator 210 stores the model of a data set in model database 220. Model generator 210 may also store, in association with the model, a name and description of the data set, a date on which the model was generated, and ID type identification data that identifies an ID type of the data set. For each unknown data set, the corresponding model may be stored with data that indicates that the data set is of an unknown ID type. Alternatively, the absence of ID type identification data in association with a model may indicate that the corresponding data set is an unknown data set.

ID Type Detection

The same model generation technique that is used to generate models based on known data sets is also used to generate models for unknown data sets. Using the same technique ensures that the similarity comparisons between two models are meaningful. Thus, model generator 210 may generate models for all data sets, regardless of whether the data sets are of known or unknown ID types.

ID type detector 230 determines whether an unknown model sufficiently matches a known model. If two models sufficiently match, then the ID type of the known model is associated with the data set of the unknown model.

ID type detector 230 implements and performs one or more similarity operations that takes two models as input (an unknown model and a known model) and produces an output, referred to as a result, measure, or score. Example similarity operations include a dot product operation, a Euclidean distance operation, and a cosine similarity operation.

A dot product of two vectors is an algebraic operation that takes two equal-length sequences of numbers and returns a single number. The dot product is the sum of the products of the corresponding entries of the two sequences of numbers. The result of a dot product operation is in the range of 0 and 1, where 0 indicates no match, 1 indicates a perfect match, and values between 0 and 1 indicate a partial match.

Euclidean distance between two vectors is a measure of similarity between those two vectors by taking the square root of the sums of squared differences of corresponding values in the two vectors. The Euclidean distance may be defined as:

$$\mathrm{sqrt}[(C_{m1}-C_{t1})^2+(C_{m2}-C_{t2})^2+(C_{mi}-C_{ti})^2+(C_{mn}-C_{tn})^2]$$

where sqrt [ ] is a square root operation, $C_m$ is the vector of the known model, $C_t$ is the vector of the unknown model, $C_{m1}$ is the first entry in $C_m$, and $C_{mn}$ is the last entry in $C_m$, meaning that there are n values in both vectors. The result of a Euclidean distance operation is in the range of 0 to a value greater than 0, where 0 indicates a perfect match.

Cosine similarity is a measure of similarity between two non-zero vectors of an inner product space. The measure is defined to be the cosine of the angle between the two vectors. The result of a cosine similarity operation is in the range of 0 and 1, where 0 indicates a perfect match, 1 indicates no match, and values between 0 and 1 indicate a partial match.

A similarity threshold value may be defined such that a score from a similarity operation that is greater than (or less than) the similarity threshold value is determined to be a sufficient match. Such a similarity threshold value may be learned based on experiments involving pairs of known models of the same ID type and, optionally, pairs of known models of different ID types. A similarity threshold value may be chosen such that (1) the similarity score of each pair of known models of the same ID type is above (or below, depending on the type of similarity operation) the similarity threshold value and (2) the similarity score of each pair of known models of different ID types is below (or above) the similarity threshold value. In situations where (1) and (2) cannot be satisfied (e.g., if a similarity score of a pair of known models of the same ID type is less than a similarity score of a pair of known models of different ID types), then the similarity threshold value may be selected to satisfy criterion (2), meaning that ID type detector 230 errors on the side of not tagging an unknown data set.

If ID type detector 230 utilizes multiple similarity operations, then each similarity operation may be associated with a different similarity threshold value, particularly for similarity operations that result in very different values when there is a perfect match. For example, for a dot product operation, the similarity threshold value may be 0.8 (where values above 0.8 indicate a sufficient match), while for a cosine similarity operation, the similarity threshold value may be 0.25 (where values below 0.25 indicate a sufficient match).

In an embodiment, if sampling was performed on the unknown data set and/or the known data set and if a similarity score is within a certain range around a similarity threshold value or another range of similarity values, then sampling may be increased. In other words, additional values from the unknown data set and/or the known data set may be sampled. With increased sampling, it may be possible that a more definitive determination can be made regarding whether to tag the unknown data set with the ID type of the known data set. For example, if a similarity score is above a first threshold (indicating that the two models are not sufficiently similar) but is below a second threshold (indicating that the two models are not sufficient dissimilar to dismiss the known model as a candidate), then sampling of the unknown data set may be increased a certain amount, such as 50%. (For example, if 1,000 values were sampled previously, another 500 values are sampled and added to the previous sample.) If, after re-sampling and recomputing the unknown model based on the resampled values, the updated similarity score is no closer to the first threshold (as compared to the first similarity score), then it may be presumed that the two models do not match. On the other hand, if the updated similarity score is closer to the first threshold than the first similarity score, then the unknown data set may be sampled again, such as a 25% increase.

Range Filtering

In an embodiment, ID type detector 230 uses a range of a data set of an unknown ID type (or "unknown data set") to remove candidate data sets of known ID types (or "known data sets"). For example, if there is no overlap of (1) the range of an unknown data set with (2) the range of a known data set (i.e., the upper bound of one range is less than the lower bound of the other range), then a similarity operation that takes a model of the unknown data set and a model of the known data set as input is skipped. Any such similarity operation would indicate no match, not even a partial match. Skipping or avoiding performance of similarity operations saves on time and computing resources.

In a related embodiment, an overlap threshold is defined such that the respective ranges of an unknown data set and a known data set must overlap above the overlap threshold in order for one or more similarity operations to be performed with respect to the models of the unknown and known data sets. Thus, even though the two ranges overlap, a similarity operation may be skipped. For example, an overlap threshold is 50%, meaning that 50% of each range must be within the other range in order to proceed to the similarity operation stage.

Tagging

If ID type detector 230 determines there is a sufficient (though imperfect) match between an unknown model and a known model, then ID type detector 230 stores, in tag database 240, tag data for the corresponding unknown data set. Tag data includes an identity of the unknown data set and an ID type of the known data set. The tag data may also include (1) a timestamp indicating a date and/or time of the tagging or the performance of the similarity operation and (2) metadata of the two data sets and/or models, such as a version number of the two data sets, a timestamp of the creation of the two models, and a sample size of the respective data sets when generating the two models.

The tag data may also include user feedback data that indicates whether a user has provided feedback with respect to the tag and, if so, whether the user confirmed the tag or declined the tag. In the depicted example, tag database 240 includes tag data for each model in model database 230. Alternatively, tag database 240 stores tag data for each data set in data sources 132-136. In the depicted example, there are three instances of tag data: 242, 244, and 246. Tag data 242 identifies data set A, an ID type indicator of ID1, and confirmation data (UC) that a user confirmed that the ID type indicator is correct. Similarly, tag data 244 identifies data set V, an ID type indicator of ID2, and confirmation data (UC) that a user confirmed that the ID type indicator is correct. On the other hand, tag data 246 identifies data set B, an ID type indicator of ID3, and confirmation data (NUC) that a user has not yet confirmed that the ID type indicator is correct.

If a user has not provided feedback for a period of time after the creation of the tag data, then ID type detection system 200 may automatically generate a new model for the unknown data set and initiate one or more similarity operations with respect to the new model and models of known data sets. The models of known data sets may also be regenerated at this time if the known data sets have changed substantially since the previous similarity operation(s) that was/were performed for the model of the unknown data set. For example, if 10% of the values (or identifiers) in a known data set have changed since the last time a model has been generated for the known data set, then a new model is generated based on the current values in the known data set.

The similarity score of a similarity operation between a known model and an unknown model may be so high that (a) user feedback is not sought or (b) user confirmation is not required. For example, if the similarity score of a dot product operation is over 0.98, then the corresponding unknown data set is tagged with the ID type of the known data set. As another example, if the similarity score of a cosine similarity operation is under 0.07, then the corresponding unknown data set is tagged with the ID type of the known data set. Thus, a "sure" similarity threshold may be defined such that if a similarity score is above (or below) that threshold, then the tag is certain rather than uncertain.

Thus, a tag may be in one of multiple states: a certain state (where user feedback is not sought or required) or an uncertain state (where user feedback is sought). For example, if a tag is in a certain state, then one or more data obfuscation operations are automatically performed on the corresponding data set, such as encrypting the values in the data set using a certain cryptographic key or hashing the values in the data set using a certain hash function. Once obfuscated, the data set may be used in data analysis, such as in (1) joining the table from which the data set belongs with another table that includes a data set of the same ID type and (2) generating training data based on the joined data. If a tag is in a certain state, then such data obfuscation is postponed until a user manually confirms that the automatic tagging of the data set is accurate.

Tag Notification

It may be important to confirm whether an automatic tagging of a data set by ID type detector 230 is accurate. Therefore, in an embodiment, a notification is generated and transmitted to a user regarding an automatic tagging. The notification may be transmitted over one or more computer networks to electronic accounts or computing devices of one or more users who are associated with the data set. Users who are familiar with the creation or use of the data set are likely to be able to confirm whether a tag is accurate. A user that is associated with a data set may be limited to users who created the data set, accessed the data set in software code composed by the user, or otherwise reviewed the data set in the recent past. Creation data or access data may be used to identify such users. Instead of identifying such users, creation data and/or access data may refer to a team of users, such as an engineering team. In such a scenario, a mapping of teams to users is accessed to identify members of a team. If there are multiple members of a team that created or accessed an unknown data set, then ID type detection system 200 may transmit a tag notification to each member.

A tag notification may be transmitted in one or more ways, including an email message, a text message, a webpage update, or an in-app message. A tag notification includes (1) an identification of the automatically tagged data set and (2) an ID type that ID type detector 230 identified for the data set. The tag notification may include user interface controls for providing input that accepts the tag or declines the tag and causing the input to be transmitted to the source of the tag notification (or another destination).

If a user accepts a tag, then ID type detection system 200 stores tag acceptance data that indicates that the ID type associated with the corresponding data set is manually confirmed. If a user affirmatively declines a tag, then ID type detection system 200 stores tag declination data that indicates that the ID type associated with the corresponding data set is not confirmed.

Matchless Models

There may be scenarios where there is no sufficient match between an unknown model and known models. In such a situation, a user is presented with multiple ID types as options to select in a user interface. The user may be identified as a user that is associated with the unknown data set. For example, if the unknown data set is a column in a table that was created by engineering team A, then ID type detection system 200 identifies members of team A and sends an invitation to each member. The invitation may be presented in an email, a text message, or an in-app notification that is transmitted to an account or smartphone of each team member. The invitation may include a list of ID types or a drop down menu that lists those ID types.

The list of ID types that are presented to a user may be all possible ID types or a strict subset thereof. If the latter, then the strict subset may be limited to ID types whose models had (a) the top N similarity scores, (b) scores above a minimum similarity threshold (that is different than a match threshold), or (c) had a range that overlap the range of the unknown model. For example, if N is five, then the ID types of the known models that had a similarity score (with respect to the unknown model) in the top 5 of all known models are included in the list of ID types. As another example, if three known models have scores above the minimum similarity threshold (but below a match threshold), then the ID types of those three known models are included in the list of ID types. As another example, the ID type of any known model whose range overlaps the range of the unknown model is included in the list of ID types.

Multiple Matches

In some scenarios, multiple known models may (substantially) match an unknown model where the corresponding similarity scores are above (or below) a certain similarity threshold. If there are multiple matches with an unknown model, then ID type detector 230 may generate a multiple match notification and transmit the notification to a user that is associated with the unknown data set, similar to a tag notification. However, the multiple match notification identifies the ID types associated with the multiple matching models. The multiple match notification may be configured to allow for the user to select one of the ID types. With a relatively short list of possible ID types from which to choose, the user is less likely to select the incorrect ID type.

Process Overview

Figure 3A:
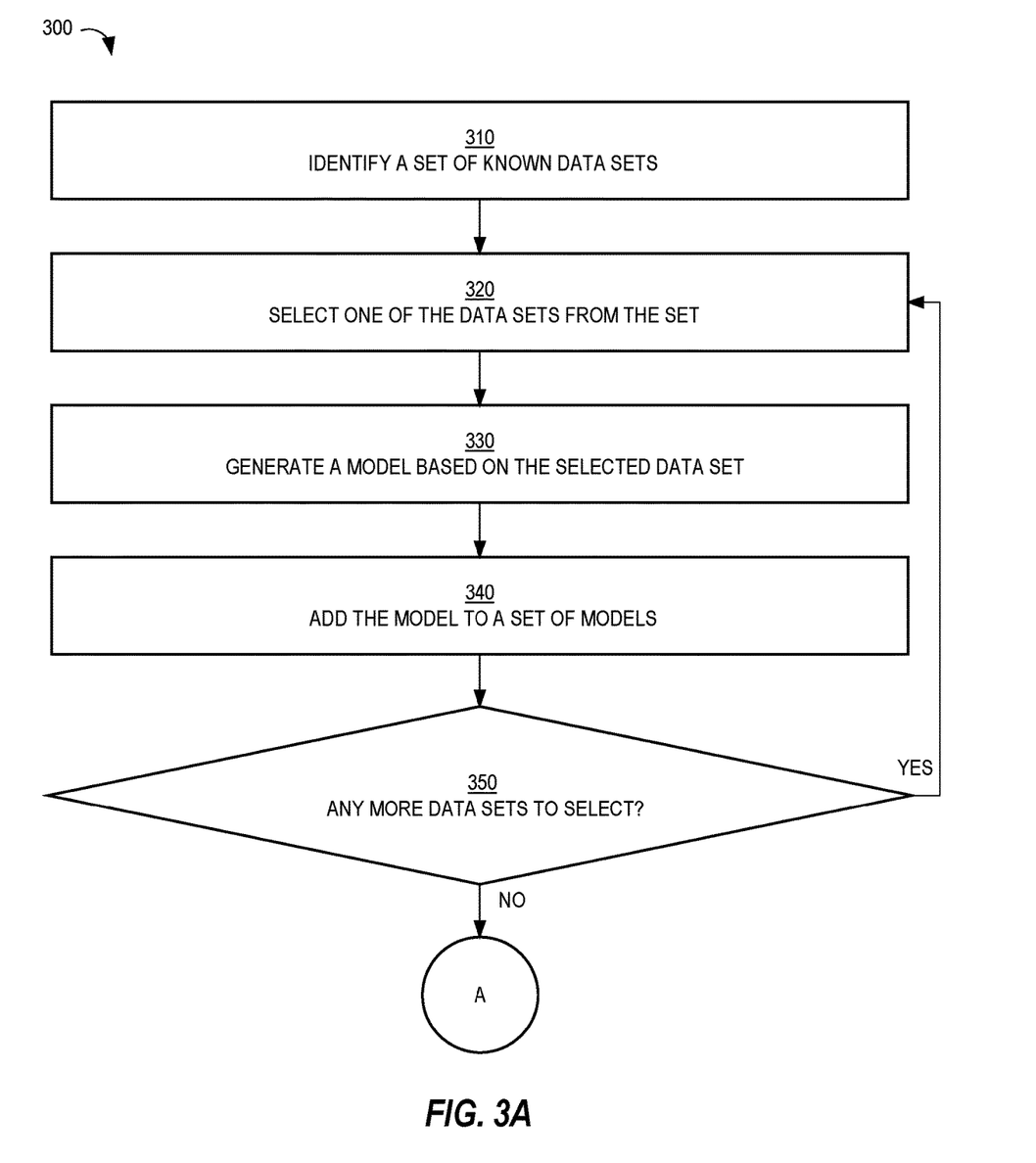
FIGS. 3A-B is a flow diagram that depicts an example process for detecting ID types for data sets of unknown ID types.
Figure 3B:
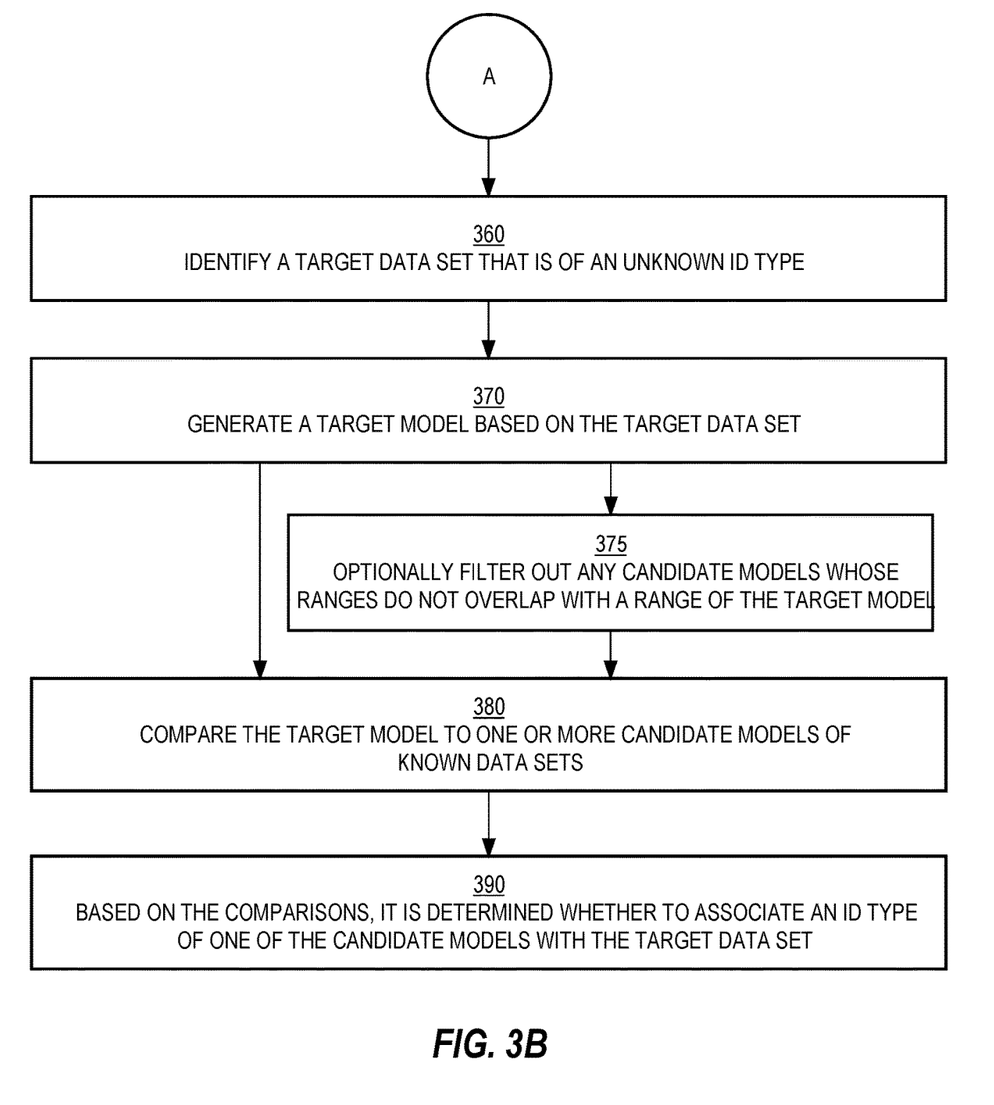

FIGS. 3A-3B is a flow diagram that depicts an example process 300 for detecting ID types for unknown data sets. Process 300 may be performed by model generation and ID type detection system 200.

At block 310, a set of known data sets is identified. Each data set contains values or identifiers that were generated by a computer system and that are classified as personal identifiable information (PII). The data sets in the set of known data sets may be stored in one or more of data sources 132-136.

Also, each data set corresponds to a known ID type. A first data set corresponds to a first ID type and a second data set corresponds to a second ID type that is different than the first ID type. However, at the time that the set of data sets are stored in data sources 132-136, data sources 132-136 may also store one or more data sets of an unknown ID type, which are processed later.

At block 320, a data set is selected from the set of data sets. Selection of a data set from the set of data sets may be random. Alternatively, known data sets for which a model has not yet been generated are prioritized over known data sets for which a model has been generated. Thus, in some scenarios, a known data set for which a model has already been generated may be selected again in order to generate another model for that data set. Such model "re-generation" may be useful if the data set is updated relatively frequently.

At block 330, a model is generated based on the data set. Block 330 may involve computing a range of the data set and/or generating a normalized vector of the data set. If a normalized vector is generated, then block 330 may first involve determining a frequency of each value or identifier in the data set and storing the frequency in an entry, of a vector, that is identified by the value.

At block 340, the model is added to a set of models that is initially empty. Block 340 may involve storing the model in model database 220. Block 340 may also involve storing ID type identification data (that identifies the ID type of the data set) in association with the model.

At block 350, it is determined whether a data set in the set of data sets has not yet been selected and, therefore, a model has not yet been generated for that data set. If so, process 300 returns to block 320; otherwise, process 300 proceeds to block 360.

At block 360, a target data set that contains identifiers that were generated by the computer system and that are classified as personal identifiable information of an unknown ID type is identified. Block 360 may involve identifying a data set that is not associated with a known ID type.

At block 370, a target model is generated based on the target data set. The same technique for generating models in block 330 may be used to generate the target model in block 370.

At block 380, the target model is compared to one or more candidate models in model database 220. Block 380 may involve comparing the target model to each candidate model in model database 220. Each comparison may involve performing one of the similarity operations described herein, such as a dot product operation or a cosine similarity operation.

In an optional block 375 that may be performed before block 380, candidate models whose ranges do not overlap a range of the target data set are filtered out and, therefore, not considered during the model comparison of block 380. Block 375 may even involve filtering candidates whose ranges do not sufficiently overlap the range of the target data set. For example, if only 25% of the range of the target data set overlaps a range of a candidate model, then the candidate model is removed from consideration in block 380.

At block 390, based on the comparison(s), it is determined whether to associate the ID type of one of the candidate models in model database 220 with the target data set. If block 380 involves comparing the target model to all candidate models in model database 220, then block 390 may involve selecting the candidate model with the highest (or lowest) score, indicating a sufficient match of the respective models. Alternatively, if the result of a comparison in block 380 results in a score that is above (or below) a certain threshold, then block 380 may end, the corresponding candidate model is identified, and the ID type of that candidate model is associated with the target data set.

Model Generation Process

Figure 4:
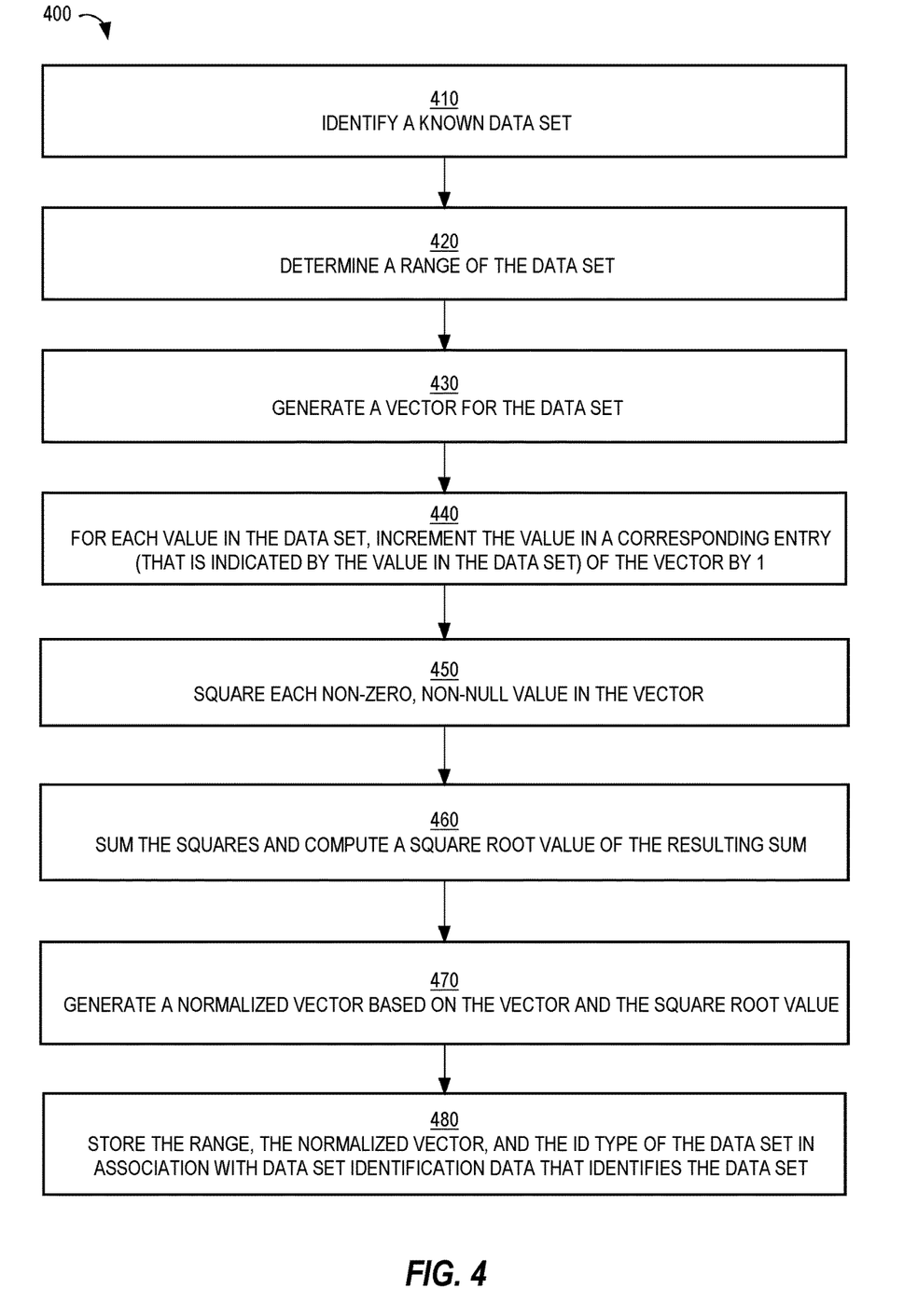
FIG. 4 is a flow diagram that depicts an example process for generating a model for a data set, in an embodiment.

FIG. 4 is a flow diagram that depicts an example process 400 for generating a model for a data set, in an embodiment. Process 400 corresponds to blocks 310-340 of FIG. 3 and may be repeated multiple times, once for each known data set.

At block 410, a known data set is identified. The data set may be identified due to being associated with ID type identification data. The data set may also be identified in response to determining that a model has not yet been generated for the data set or, if such a model has been generated, then (a) a certain amount of time has elapsed (e.g., one month) since the model was generated or (b) a certain amount of changes have been made to the data set since the most recent model for the data set has been generated.

At block 420, a range of the known data set is determined. For example, a minimum value in the known data set is determined and a maximum value in the known data set is determined. The minimum value and the maximum value is the range.

At block 430, a vector is generated of a certain size. Each entry in the vector may have a value of 0 or NULL.

At block 440, for each value in the known data set, the value in an entry (that is indicated by the value in the known data set) of the vector is incremented by 1 or, if the initial value in the entry is NULL, then the value in the entry is set to 1. For example, the first value in the known data set is identified, the first value becomes an index into the vector, an entry of the vector at the index is identified, and the value in that entry is incremented by 1.

At block 450, each non-zero value in the vector is squared.

At block 460, the squares computed in block 450 are summed and a square root value is computed from the resulting sum.

At block 470, a normalized vector is generated based on the vector and the square root value computed in block 460. Block 470 involves dividing each non-zero value in the vector by the square root value.

At block 480, the range, the normalized vector, and the ID type of the known data set are stored in association with data set identification data that identifies the known data set.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
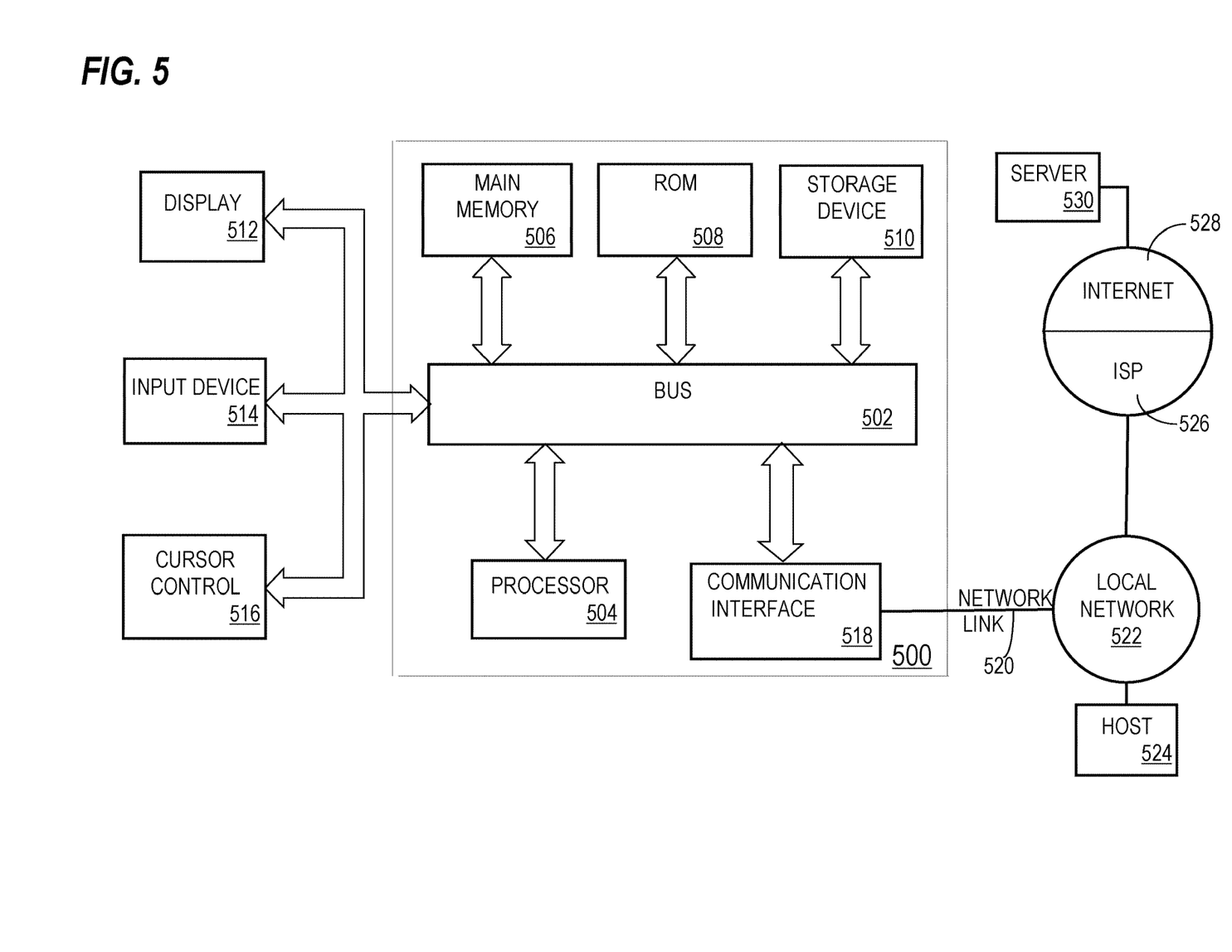
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a plurality of data sets, each of the data sets containing identifiers that were generated by a computer system and that qualify as personal identifiable information;
   wherein each of the data sets of the plurality of data sets corresponds to a known identifier (ID) type, wherein a data set has a known ID type if the ID type of the data set is known in the computer system;
   wherein a first data set of the plurality of data sets corresponds to a first ID type and a second data set of the plurality of data sets corresponds to a second ID type that is different than the first ID type;
   for each of the data sets in the plurality of data sets, generating a model based on the data set and adding the model to a set of models;
   identifying a target data set that contains identifiers that were generated by the computer system and that qualify as personal identifiable information of an unknown ID type, wherein the ID type of the target data set is unknown in the computer system;
   generating a target model based on the target data set; and
   for at least one model in the set of models, performing a similarity operation of the target model and the at least one model and, based on the similarity operation, determining whether to associate the ID type of the at least one model with the target data set;
   wherein the method is performed by one or more computing devices.

2. The method of claim 1, wherein:
   the target model comprises a first vector and the at least one model comprises a second vector;
   the similarity operation generates a similarity score based on the first vector and the second vector.

3. The method of claim 1, wherein the similarity operation is one of a dot product operation, a Euclidean distance operation, or a cosine similarity operation.

4. The method of claim 1, wherein generating the target model comprises:
   for each identifier in the target data set:
      determining a number of times that the identifier occurs in the target data set;
      computing a square of the number of times; and
      adding the square to a summation value;
   computing a square root value of the summation value;
   for each identifier in the target data set:
      determining a number of times that the identifier occurs in the target data set;
      computing a result by dividing the number of times by the square root value;
      storing the result as part of the target model.

5. The method of claim 4, wherein:
generating the target model comprises:
determining a target range of the target data set;
storing the target range as part of the target model;
performing the similarity operation comprises comparing the target range with a range of the model.

6. The method of claim 4, wherein:
storing the result as part of the target model comprises storing the result in a position, of a target vector, that corresponds to said each the identifier;
performing the similarity operation comprises comparing the target vector with a vector of the model.

7. The method of claim 1, wherein:
performing the similarity operation of the target model and the model comprises:
generating a first score as a result of performing a first similarity operation of the target model and a first model in the set of models, and
generating a second score as a result of performing a second comparison of the target model and a second model of the set of models;
the method further comprising, in response to determining that the first score and the second score are above or below a score threshold, storing ID type data that associates, with the target model, the first ID type of the first model and the second ID type of the second model.

8. The method of claim 1, further comprising:
based on a plurality of similarity operations that are performed with respect to the target model and the set of models, identifying a strict subset of the set of models;
causing an ID type associated with each model in the strict subset to be presented on a computing device of a user that is associated with the target data set.

9. The method of claim 1, further comprising:
determining to associate the first ID type with the target data set;
causing association data that associates the first ID type with the target data set to be presented on a computing device of a user that is associated with the target data set.

10. The method of claim 9, further comprising:
causing confirmation data to be presented on the computing device, wherein the confirmation data invites the user to confirm whether the first ID type should be associated with the target data set.

11. The method of claim 10, further comprising:
in response to receiving, from the computing device, input that indicates confirmation that the first ID type should be associated with the target data, storing tagging data that assigns the first ID type to the target data set;
based on the tagging data, generating an obfuscated version of the target data set based on obfuscation data that is associated with the first data set.

12. The method of claim 11, wherein the obfuscated version is a hashed version or an encrypted version of the target data set.

13. The method of claim 1, further comprising:
determining to associate the first ID type with the target data set;
in response to determining to associate the first ID type with the target data set, generating an obfuscated version of the target data set based on obfuscation data that is associated with the first data set.

14. One or more storage media storing instructions which, when executed by one or more processors, cause:
identifying a plurality of data sets, each of the data sets containing identifiers that were generated by a computer system and that qualify as personal identifiable information;
wherein each of the data sets of the plurality of data sets corresponds to a known identifier (ID) type, wherein a data set has a known ID type if the ID type of the data set is known in the computer system;
wherein a first data set of the plurality of data sets corresponds to a first ID type and a second data set of the plurality of data sets corresponds to a second ID type that is different than the first ID type;
for each of the data sets in the plurality of data sets, generating a model based on the data set and adding the model to a set of models;
identifying a target data set that contains identifiers that were generated by the computer system and that qualify as personal identifiable information of an unknown ID type, wherein the ID type of the target data set is unknown in the computer system;
generating a target model based on the target data set; and
for at least one model in the set of models, performing a similarity operation of the target model and the at least one model and, based on the similarity operation, determining whether to associate the ID type of the at least one model with the target data set.

15. The one or more storage media of claim 14, wherein:
the target model comprises a first vector and the at least one model comprises a second vector;
the similarity operation generates a similarity score based on the first vector and the second vector.

16. The one or more storage media of claim 14, wherein generating the target model comprises:
for each identifier in the target data set:
determining a number of times that the identifier occurs in the target data set;
computing a square of the number of times; and
adding the square to a summation value;
computing a square root value of the summation value;
for each identifier in the target data set:
determining a number of times that the identifier occurs in the target data set;
computing a result by dividing the number of times by the square root value;
storing the result as part of the target model.

17. The one or more storage media of claim 14, wherein:
performing the similarity operation of the target model and the model comprises:
generating a first score as a result of performing a first similarity operation of the target model and a first model in the set of models, and
generating a second score as a result of performing a second comparison of the target model and a second model of the set of models;
the instructions, when executed by the one or more processors, further cause, in response to determining that the first score and the second score are above or below a score threshold, storing ID type data that associates, with the target model, the first ID type of the first model and the second ID type of the second model.

18. The one or more storage media of claim 14, wherein the instructions, when executed by the one or more processors, further cause:
- based on a plurality of similarity operations that are performed with respect to the target model and the set of models, identifying a strict subset of the set of models;
- causing an ID type associated with each model in the strict subset to be presented on a computing device of a user that is associated with the target data set.

19. The one or more storage media of claim 14, wherein the instructions, when executed by the one or more processors, further cause:
- determining to associate the first ID type with the target data set;
- causing association data that associates the first ID type with the target data set to be presented on a computing device of a user that is associated with the target data set.

20. The one or more storage media of claim 14, wherein the instructions, when executed by the one or more processors, further cause:
- determining to associate the first ID type with the target data set;
- in response to determining to associate the first ID type with the target data set, generating an obfuscated version of the target data set based on obfuscation data that is associated with the first data set.

* * * * *